(12) United States Patent
Jiang et al.

(10) Patent No.: US 9,829,081 B2
(45) Date of Patent: Nov. 28, 2017

(54) TENSIONER FOR ENGINE WITH LARGE AND STABLE DAMPING AND MINIMUM DEFLECTION O F SHAFT

(71) Applicant: Ningbo Fengmao Far-East Rubber Co., Ltd., Ningbo, Zhejiang (CN)

(72) Inventors: Chunlei Jiang, Ningbo (CN); Ke Yang, Ningbo (CN)

(73) Assignee: Ningbo Fengmao Far-East Rubber Co., Ltd, Yuyao, Ningbo (CN)

( * ) Notice: Subject to any disclaimer, the term of this patent is extended or adjusted under 35 U.S.C. 154(b) by 145 days.

(21) Appl. No.: 14/621,333

(22) Filed: Feb. 12, 2015

(65) Prior Publication Data

US 2015/0276024 A1 Oct. 1, 2015

(30) Foreign Application Priority Data

Mar. 25, 2014 (CN) .................. 2014 2 01358550 U

(51) Int. Cl.
  *F16H 7/12* (2006.01)
  *F16H 7/08* (2006.01)

(52) U.S. Cl.
  CPC ..... *F16H 7/1218* (2013.01); *F16H 2007/081* (2013.01); *F16H 2007/0865* (2013.01); *F16H 2007/0893* (2013.01)

(58) Field of Classification Search
  CPC ............. F16H 7/1218; F16H 2007/081; F16H 2007/084; F16H 2007/0893; F16H 7/1281
  USPC ........................................................ 474/135
  See application file for complete search history.

(56) References Cited

U.S. PATENT DOCUMENTS

| | | | | |
|---|---|---|---|---|
| 4,696,663 A * | 9/1987 | Thomey | ................ | F16H 7/1218 474/133 |
| 5,632,697 A * | 5/1997 | Serkh | ................... | F16H 7/1218 474/109 |
| 5,647,813 A * | 7/1997 | Serkh | ................... | F16H 7/1218 474/101 |
| 5,964,674 A * | 10/1999 | Serkh | ................... | F16H 7/1218 474/101 |
| 6,497,632 B2 * | 12/2002 | Ayukawa | .............. | F16H 7/1218 474/135 |
| 6,565,468 B2 * | 5/2003 | Serkh | ................... | F16H 7/1218 474/135 |
| 6,582,332 B2 * | 6/2003 | Serkh | ................... | F16H 7/1218 474/109 |

(Continued)

*Primary Examiner* — Henry Liu
(74) *Attorney, Agent, or Firm* — Raymond Y. Chan; David and Raymond Patent Firm

(57) ABSTRACT

A tensioner includes a base, a tension arrangement rotatable at the base, a damping member being rotated in a loading direction by the tension arrangement, and an elastic member biasing against the damping member. The position of the damping member depends by the layout geometry of the specific application and is directly in opposition to the hub load. The reaction force of the cylindrical surface of the base on the damping member is very near to the plan of the external forces represented by the hub load to minimize the deflection of the shaft. The tension arrangement is rotated to push the damping member for generating a first positive tension between the damping member and the base, and to expand the elastic member radially for generating a second positive tension between the elastic member and the damping member, so as to enhance a damping force of the tensioner.

6 Claims, 16 Drawing Sheets

(56) References Cited

U.S. PATENT DOCUMENTS

| | | | | |
|---|---|---|---|---|
| 6,609,988 B1* | 8/2003 | Liu | F16H 7/1218 | 474/133 |
| 7,819,765 B2* | 10/2010 | Kawahara | F16H 7/1218 | 474/135 |
| 7,985,151 B2* | 7/2011 | Singer | F16H 7/1218 | 474/117 |
| 8,118,698 B2* | 2/2012 | Guhr | F16H 7/1218 | 474/135 |
| 8,562,467 B2* | 10/2013 | Mennerat | F16H 7/1218 | 474/135 |
| 2002/0010044 A1* | 1/2002 | Ayukawa | F16H 7/1218 | 474/135 |
| 2002/0010045 A1* | 1/2002 | Serkh | F16H 7/1218 | 474/135 |
| 2002/0032089 A1* | 3/2002 | Serkh | F16H 7/1218 | 474/135 |
| 2003/0216204 A1* | 11/2003 | Serkh | F16H 7/1218 | 474/135 |
| 2005/0043131 A1* | 2/2005 | Asbeck | F16H 7/1218 | 474/135 |
| 2005/0096168 A1* | 5/2005 | Serkh | F16H 7/1218 | 474/135 |
| 2006/0079360 A1* | 4/2006 | Jung | F16H 7/1218 | 474/135 |
| 2007/0249446 A1* | 10/2007 | Hao | F16H 7/1218 | 474/135 |
| 2009/0082146 A1* | 3/2009 | Singer | F16H 7/1218 | 474/135 |
| 2009/0181815 A1* | 7/2009 | Guhr | F16H 7/1218 | 474/135 |
| 2010/0105508 A1* | 4/2010 | Mennerat | F16H 7/1218 | 474/135 |
| 2010/0173738 A1* | 7/2010 | Guhr | F16H 7/1218 | 474/135 |
| 2010/0184546 A1* | 7/2010 | Singer | F16H 7/1218 | 474/135 |
| 2010/0234155 A1* | 9/2010 | Antchak | F16H 7/1218 | 474/135 |
| 2011/0015016 A1* | 1/2011 | Serkh | F16H 7/1218 | 474/135 |
| 2011/0015017 A1* | 1/2011 | Serkh | F16H 7/1218 | 474/135 |
| 2011/0105261 A1* | 5/2011 | Hodjat | F16H 7/1218 | 474/135 |
| 2011/0177897 A1* | 7/2011 | Ward | F16H 7/1209 | 474/135 |
| 2011/0312455 A1* | 12/2011 | Lannutti | F16H 7/1218 | 474/135 |
| 2012/0004059 A1* | 1/2012 | Ma | F16H 7/1218 | 474/135 |
| 2012/0010034 A1* | 1/2012 | Gilmer | F16F 7/06 | 474/135 |
| 2012/0028744 A1* | 2/2012 | Hartmann | F16H 7/1218 | 474/135 |
| 2012/0058848 A1* | 3/2012 | Lannutti | F16H 7/1218 | 474/135 |
| 2012/0115657 A1* | 5/2012 | Antchak | F16H 7/1218 | 474/135 |

* cited by examiner

TENSIONER FOR ENGINE WITH LARGE AND STABLE DAMPING AND MINIMUM DEFLECTION O F SHAFT

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a tensioner for engines, and more particularly to a tensioner for an engine with large and stable damping and minimum deflection of the shaft.

Description of Related Arts

Endless transmission device, such as belt drive or chain drive, is commonly used for transmitting power from one component to the other during the operation of engine. However, once the tooth profile of the endless transmission device is worn, slippage will occur. As a result, the endless transmission device not only losses its power transmitting ability but also can be noisy. If the slippage of the endless transmission device keeps occurring, the noise will become serious. This noise problem from the slippage of the endless transmission device is often the biggest problem for the driver of the vehicle in pursuit of silent. In addition, the slipping of the endless transmission device will also shorten the service life span thereof. The damaged endless transmission device will damage the engine as well. Therefore, a tensioner is required for incorporating with the endless transmission device to maintain the tension thereof. In other words, the belt drive or the chain drive can be remained in a stable tension state by the tensioner in order to prevent the belt drive or the chain drive from slipping or tooth-skipping.

In the current market, an automatic belt tensioner with a damping mechanism is able to solve the vibration and noise problems from the front assembly of the engine. However, most of the existing damping mechanism technologies have the common problems of lacking a damping force with the severe attenuation of the damping force.

Referring to FIGS. 6 to 9 of the drawings, these are the two common conventional designs utilized in the current market. The first conventional tensioner comprises a dish-shaped elastic member 25 being squeezed along its axis direction to be deformed by a pressing force, so as to generate an axial force to a damping member 26 and a cover 27, wherein the damping member 26 and the cover 27 are closely connected with each other to define a connection surface 28. Since the damping member 26 is made of wearable materials, and the cover 27 and the damping member 26 is rotated relatively during the operation of the tensioner, the connection surface 28 has friction coefficients. So a friction force, which is generated between the damping member 26 and the cover 27 during the relative rotation operation therebetween, is determined by the pressing force provided by the dish-shaped elastic member 25. In addition, the elastic member 25 is made of material with high rigidity, so that a small amount of compression of the elastic member 25 will generate a relatively large amount of axial force. In other words, even if the change of the compression displacement of the elastic member 25 is small, the change of the pressing force produced towards the axial direction will relatively large. Normally, the rigidity level of the elastic member is approximately 2000 N/mm, so that all relevant parts of the tensioner will be collected towards the axial direction. In addition, since the axial force becomes very large, the damping will be unstable. Furthermore, after the tensioner is used for a long time, a clearance between the damping member 26 and the cover 27 will become very large due to the friction force therebetween. Therefore, the compression displacement of the elastic member 25 will gradually decrease, and the damping force generated from the elastic member 25 will normally be dropped more than 50%. Therefore, large amount of deformation of the elastic member 25 is required in order to maintain enough frictional forces between the damping member 26 and the cover 27. However, the compression displacement of the elastic member of the tensioner is constant in the initial design, so the frictional forces between the damping member 26 and the cover 27 will gradually decrease during the operation of the tensioner. Accordingly, the tensioner cannot be designed to provide sufficiently large amount of friction forces. For example, in order to provide 500 N of frictional forces by the tensioners, the elastic member 25 must be designed to provide at least 1000 N of frictional forces. Conversely, if the elastic member 25 is designed to generate 500 N of frictional forces, the remaining frictional forces provided by the elastic member 25 will be decreased to 250 N or even lower after the tensioner is in use for a period of time. In other words, the biggest drawback of the above mentioned tensioner is that the frictional forces are dramatically decreased with use, so that the attenuation of damping is serious. Therefore, the tensioner must be maintained frequently in order to meet the dampening requirements.

Referring to FIG. 8 and FIG. 9 of the drawings, a second conventional tensioner is illustrated, wherein the second conventional tensioner comprises an elastic member 30 which is loaded after assembling. The elastic member 30 is loaded by means of pulling operation, wherein the elastic member 30 comprises a first hook end 32 and an opposed second hook end 33, wherein the first hook end 32 is attached with an annular damping member 29, and the second hook end 33 is attached with a tension arm 31. The annular damping member 29 is installed in an inner diameter of the elastic member 30, wherein an outer surface of the damping member 29 is contacted with the inner surface of the elastic member 30, and the inner surface of the damping member 29 is contacted with a top surface 34 of the tension arm 31, such that the frictional forces will be generated between the damping member 29 and the tension arm 31. In other words, the damping member 29 is located between the elastic member 30 and the tension arm 31. When the tensioner is operated, the damping member 29 is rotated with respect to the top surface 34 of the tension arm 31 to generate frictional forces, wherein the diameter of the elastic member 30 is gradually decreased during the rotation of the tension arm 31, so as to generate a pressing force to the damping member 29. So, the damping member 29 is closely contacted with the tension arm 31 by the pressing force, to provide sufficiently large amount of friction force between the damping member 29 and the tension arm 31. However, the above mentioned structure has the following disadvantages. Although the attenuation of the frictional forces is lower than the first conventional tensioner, the second conventional tensioner only can provide low power of frictional force. Since the positive frictional force only comes from one source, the ratio of the torque of the damping torque and torque of the elastic member cannot exceed 0.6, which cannot meet some of the large damping system requirements. Since the pressing forces applied on the damping member 29 is determined by the change of the inner diameter of the elastic member 30, the cost for manufacturing the elastic member 30 to provide large amount of damping forces will be increased correspondingly. In addition, the change of the inner diameter of the elastic element 30 is determined by the tensile of the elastic element 30. In other words, the change of the inner diameter of the elastic member 30 is determined by the tensile of the elastic member 30, and then the pressing forces applied on the damping member 29 are determined by the change of the inner diameter of the elastic member 30, so the damping member 29 cannot provide large amounts of frictional forces. Therefore, it is preferred that the pressing forces applied on the damping member 29 is directly determined by the tensile of the elastic member 30, so as to minimize the energy loss during the transformation process. Conversely, the tensile for the damping member 29 is amplified via the change of the inner diameter of the elastic member 30 as well as that the damping member 29 is worn. In other words, the dimension change of the damping member 29 due to the wear and tear thereof is made up by the dimension change of the inner diameter of the elastic member 30. However, the change of the inner diameter of the elastic member 30 and the tensile thereof are mutually corresponding. So, it is preferred that the elastic member 30 should have small change of the inner diameter and large tensile. As a result, the wear and tear of the damping member 29 has stronger effect to the frictional forces. In other words, the frictional forces are decreased after the tensioner is operated during a period of time, and the attenuation of the friction force is still large.

SUMMARY OF THE PRESENT INVENTION

A main object of the present invention is to provide a tensioner for engines, wherein the tensioner can provide a large and stable significant damping effect, and the damping will not be dramatically decreased during the operation of the tensioner. Furthermore, the deflection of the shaft is minimized.

According to the present invention, the foregoing and other objects and advantages are attained by a large damping and low attenuation tensioner for engines, comprising a base, a retention arrangement, a tension arrangement, an elastic member disposed inside the base, and a damping member arranged inside the base. The base has an inner cylindrical surface, and the damping member has a friction surface, wherein the friction surface and the inner cylindrical surface are contacted with each other to generate a frictional force during a relative movement therebetween. The tension arrangement comprises a projected member, wherein while the tension arrangement is rotated with respect to the base, the projected member pushes the damping member to rotate. The elastic member is a cylindrical and helical torsion spring, and the elastic member comprises two end faces, which are a first end surface and a second end surface, wherein the first end surface is contacted with the damping member, and the second end surface is contacted with the base. Therefore, while the elastic member is radially expanded towards a loading direction, the damping member is pushed to closely contact with the inner cylindrical surface of the base by the outer circumference of the elastic member.

The frictional force is generated by a relative movement between the inner cylindrical surface of the base and the damping member, such that the tension arrangement is rotated with respect to the base for pushing the damping member, and the elastic member is compressed by the damping member, so as to provide the torque for the tensioner, which can also generate a first positive tension. At the same time, while the elastic member is radially expanded, the damping member will be pushed to closely contact with the inner cylindrical surface of the base, so as to generate a second positive tension. Due to that the first and second positive tensions are generated at the same time, a huge amount of frictional damping force is generated. The ratio of the torque for the damping and the elastic member is larger than 0.85. Since the first positive tension and the second positive tension are provided from the torque of the elastic member, the first and second positive tension have a linear correlation with the torque of the elastic member. Since the attenuation of the frictional force is determined by the attenuation of the torque of the elastic member, the attenuation of the frictional force will not exceed 15% during the entire life-span of the tensioner of the present invention.

Preferably, the damping member comprises two end surfaces, which is a third end surface and a fourth end surface, wherein the third end surface and the fourth end surface are closely contacted with the first end surface of the elastic member and the projected member of the tension arrangement respectively, such that while the elastic member is rotated towards the loading direction, the first positive tension will be generated by the elastic member and the projected member.

Preferably, the damping member comprises an inner cylindrical surface, wherein while the elastic member is radially expanded, the outer circumference of the elastic member is pressed towards the inner cylindrical surface of the damping member, so as to generate a second positive tension.

Preferably, the damping member comprises a damping cover and a damping body, wherein the damping body is made of rigid material, and the damping cover is made of elastic material, and mating tooth arranged in the joint portion formed between the damping body and the damping cover.

Preferably, a large damping and low attenuation tensioner for engines can provide a huge amount of frictional force, and the attenuation of the frictional force is relatively small during the entire life-span circle.

Another object of the present invention is to provide a large damping and low attenuation tensioner, which can provide a large frictional force and further solve problems of vibrations and noise generated from the front parts of the engines.

Another object of the present invention is to provide a large damping and low attenuation tensioner, which can guarantee a low attenuation of the damping, such that the tensioner has a longer life-span to maintain a normal working operation for the engine. Furthermore, the tensioner is designed to minimize the deflection of the shaft.

Another object of the present invention is to provide a large damping and low attenuation tensioner, wherein two positive tensions generated towards the same direction are applied on the damping member, such that the overall positive tension applied on the damping member is enhanced to achieve a high damping tensioner.

Another object of the present invention to provide a large damping and low attenuation tensioner, wherein the positive tensions applied on the damping member are provided by the torque generated from the elastic member, such that the strength of the positive tension is determined by the amount of the deformation of the elastic member.

Another object of the present invention provides a low attenuation and large damping tensioner, wherein the dimension change of the damping member has relatively small impact with respect to the torsion angle of the elastic member, in such a manner that the change of the torque is extremely small, so as to maintain a constant amount of positive tension on the damping member.

Additional advantages and features of the invention will become apparent from the description which follows, and may be realized by means of the instrumentalities and combinations particular point out in the appended claims.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 1:
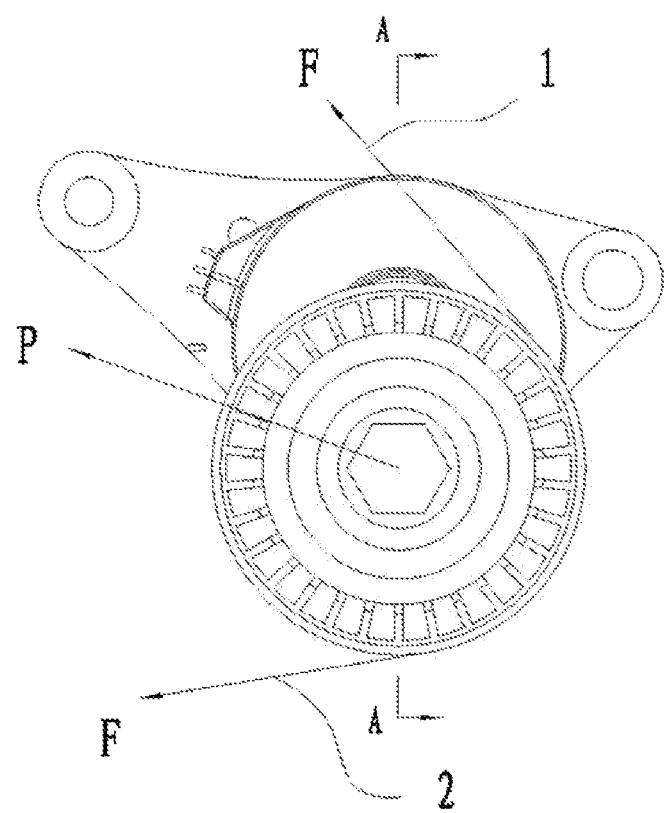
FIG. 1 is a perspective view of a large damping and low attenuation tensioner for engines according to a first preferred embodiment of the present invention, illustrating a belt wrapping on the tensioner.
Figure 2:
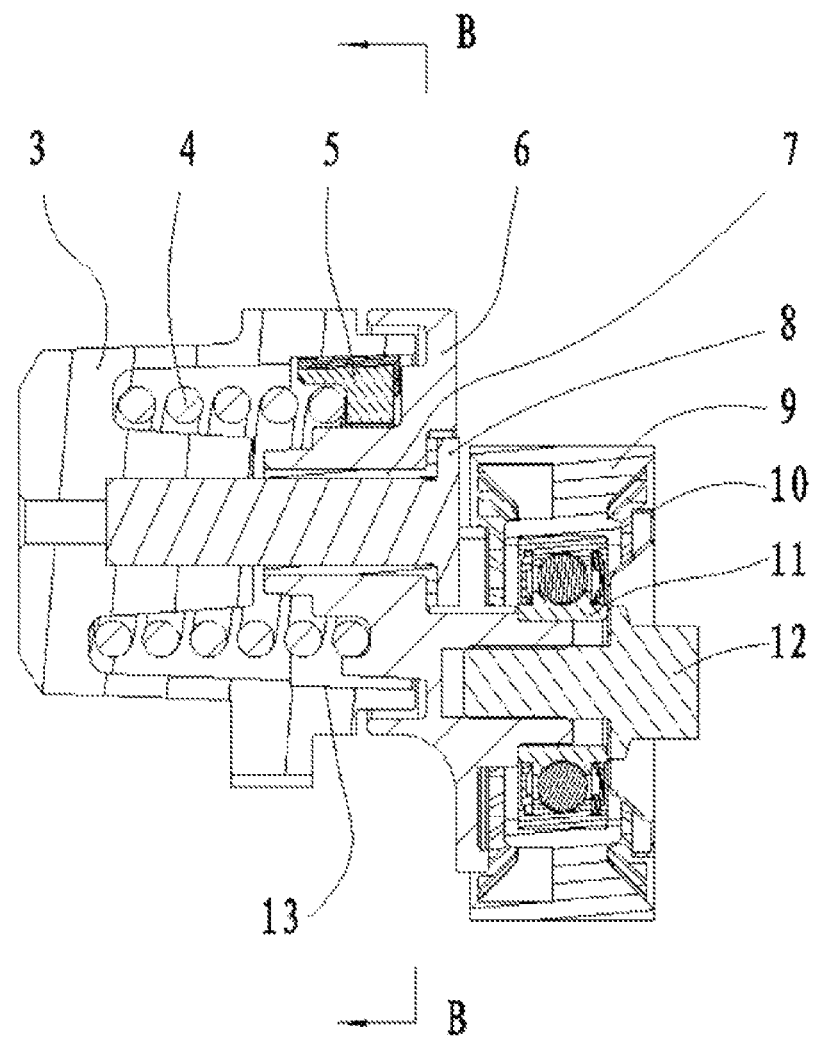
FIG. 2 is a sectional view of a large damping and low attenuation tensioner for engines according to the above first preferred embodiment of the present invention.

Referring to FIG. 1 and FIG. 2 of the drawings, a large damping and low attenuation tensioner for engines according to a preferred embodiment of the present invention, wherein the tensioner comprises a base 3, a retention arrangement 8 serving as a core shaft, a tension arrangement 6, an elastic member 4 disposed within the base 3 in a non-rotatably movable manner, and a damping member 5, such as a damping shoe, arranged inside the base 3, wherein the elastic member 4 is arranged to bias against an inner surface of the damping member 5. The tension arrangement 6 is rotatably coupled with the base 3 via the core shaft of the retention arrangement 8, such that the elastic member 4 and the damping member 5 are closely sealed inside the base 3 and the tension arrangement 6.

The base 3 has an inner cylindrical surface 13, and the damping member 5 has a friction surface 14, wherein the friction surface 14 and the inner cylindrical surface 13 are frictionally contacted with each other to generate a frictional force during a relative movement therebetween. The tension arrangement 6 comprises a projected member 19, wherein while the tension arrangement 6 is rotated with respect to the base 3, the projected member 19 will push the damping member 5 to rotate. The elastic member 4 is a cylindrical torsion spring. Preferably, the elastic member 4 has a helical structure. The elastic member 4 comprises two end faces, which are a first end surface 16 and a second end surface 17, wherein the first end surface 16 is preferably defined at an upper surface of the elastic member 4, and the second end surface 17 is preferably defined at a bottom surface of the elastic member 4. In addition, the first end surface 16 couples with the damping member 5, and the second end surface 17 couples with the bottom side of the base 3. It is worth mentioning that since the upper surface of the elastic member 4 is symmetrically arranged with the bottom surface of the elastic member 4, the first end surface 16 and the second end surface 17 are symmetrically arranged with each other. Furthermore, the first end surface 16 and the second end surface 17 are not flat surfaces, so while either the first end surface 16 or the second end surface 17 are placed on a flat surface, the elastic member 4 is inclinedly and vertically arranged with respect to the flat surface.

Figure 3:
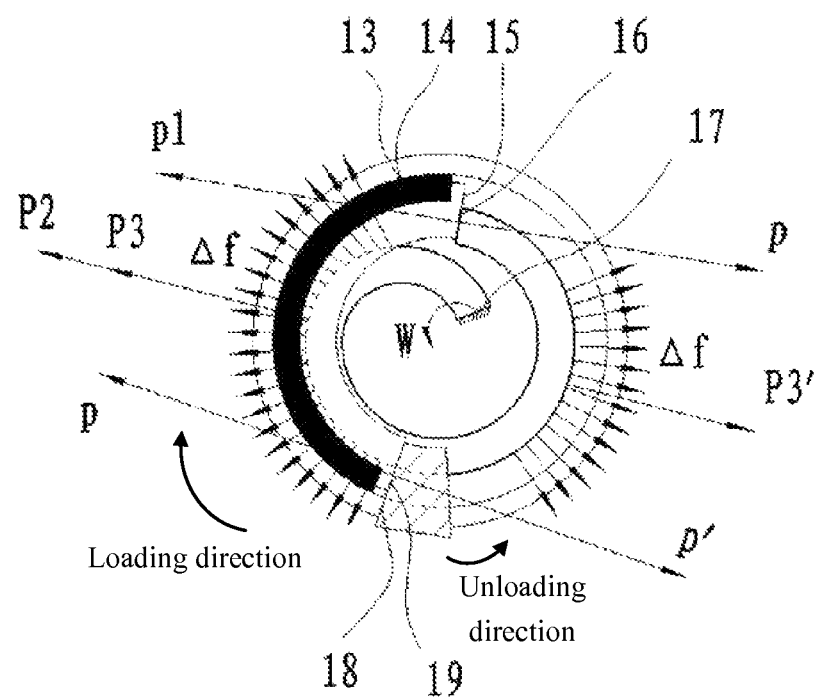
FIG. 3 is a sectional view of a large damping and low attenuation tensioner for engines according to the above preferred embodiment of the present invention, illustrating a forcing relation between all parts of the tensioner.
Figure 4:
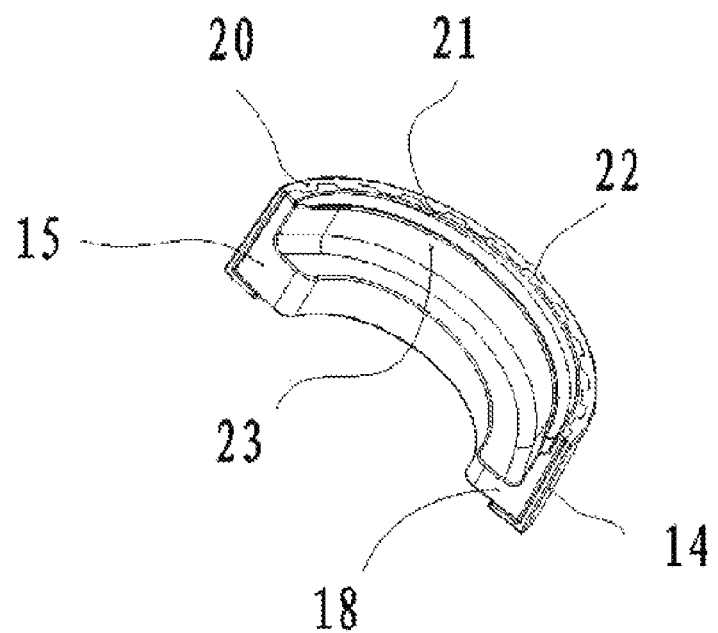
FIG. 4 is a perspective view of a damping member of a large damping and low attenuation tensioner for engines according to the above preferred embodiment of the present invention.

As shown in FIG. 3, the damping member 5 is able to rotate towards an unloading direction and a loading direction by being pushed by the projected member 19. The damping member 5 has a sliding cavity 23 formed at the inner surface of the damping member 5, and the elastic member 4 is frictionally contacted with a sliding surface of the sliding cavity 23 of the damping member 5, i.e. the inner surface thereof. Therefore, while the damping member 5 is rotated in the loading direction, the elastic member 4 is radially expanded, and then the projected member 19 is pushed to closely contact with the inner cylindrical surface 13 of the base 3 by an outer circumference of the elastic member 4. In other words, while the damping member 5 is rotated in the unloading direction, the elastic member 4 is compressed, so the projected member 19 is moved away from the inner cylindrical surface 13 of the base 3.

It is worth mentioning that the base 3 and the retention arrangement 8 are connected with each other by means of interference fit, wherein the tension arrangement 6 is rotatably coupled with the retention arrangement 8 to ensure the elastic element 4 and the damping member 5 to be retained between the bottom of the base 3 and the tension arrangement 6. The tensioner further comprises a pulley 9, a dust cover 10, a bearing 11, and a screw 12, wherein the pulley 9, the dust cover 10, the bearing 11, and the screw 12 are arranged to corporate with the tension arrangement 6, so as to rotate with respect to the retention arrangement 8. In addition, the tension arrangement 6 and the retention arrangement 8 are separated by a bush 7.

It is worth mentioning that the position of the damping member 5 depends by the layout geometry of the specific application and is directly in opposition to the hub load P indicated in FIG. 1.

A second significant aspect of the design is that the reaction of the cylindrical surface 13 of the base 3 on the damping member 5 is very near to the plan of the external forces represented by the hub load P, as shown in FIG. 1, as to minimize the deflection torque taken by the shaft. In other words, the above features will minimize the deflection of the shaft of the retention arrangement 8 due to the external force P.

The damping member 5 has an arc-shape defining two ends, which are a third end surface 15 and a fourth end surface 18, wherein the third end surface 15 couples with the first end surface 16 of the elastic member 4, and the fourth end surface 18 couples with the projected member 19 of the tension arrangement 6. In addition, while the elastic member 4 is radially expanded as well as that the damping member 5 is rotated towards the loading direction, the damping member 5 and the projected member 19 are both rotated towards the loading direction to generate a resultant force, which is a first positive tension. Accordingly, when the elastic member 4 is radially expanded, the outer circumference of the elastic member 4 is closely pressed towards the sliding surface of the sliding cavity 23 of the damping member 5, so as to generate a second positive tension. It is worth mentioning that both the first and second positive tensions are in form of frictional forces.

The damping member 5 comprises a damping cover 20 and a damping body 21, wherein the damping body 21 is made of rigid material. The damping body 21 can be made of cast steels, powder metallurgy components, or other material having a predetermined amount of strength and an easily-molding structure. The damping cover 20 is made of elastic material, wherein the elastic material can be wear-resistant nylon. In order to improve the frictional coefficient of the damping cover 21, a plurality of anti-slip strips is provided on the damping cover 21. During the manufacturing of the damping member 5, the elastic material is mold-injected on an outer circumferential surface of the damping body 21 to form the damping cover 20. The damping cover 20 and the damping body 21 are combined with each other to define a joint portion, wherein a plurality of spaced apart mating teeth 22 are arranged in the joint portion. The mating teeth 22 are concavo-convex concerted mating teeth extended from the damping body 21 to the damping cover 20, so as to restrict the relative rotational movement between the damping body 21 and the damping cover 20. In addition, the damping body 21 is a semicircular structure, and the sliding cavity 23 of the damping member 5 is formed at the inner surface of the semicircular structure of the damping body 21. Furthermore, the damping cover 20 covers on the outer surface of the damping body 21 as a sleeve thereof, so that the damping cover 20 also has a semicircular structure.

As shown in FIG. 1, the tensioner is operated in an equilibrium situation, a first band segment 1 and a second band segment 2, which are defined as tension forces F, are combined to form an action force P of the hub load (resultant force at the band segment 1 and the second band segment 2) on the tensioner.

Figure 5:
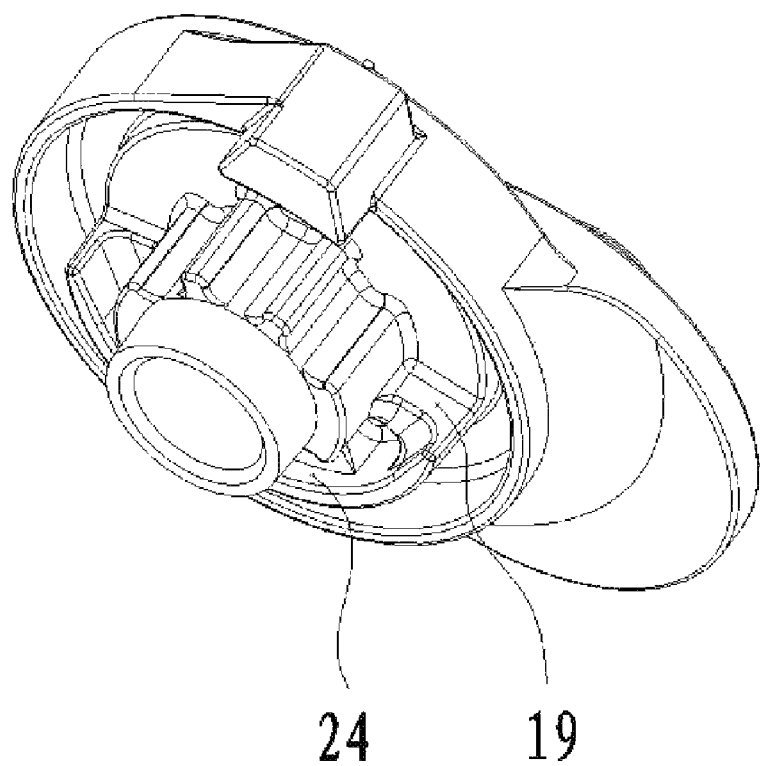
FIG. 5 is a perspective view of a tension arrangement of a large damping and low attenuation tensioner for engines according to the above preferred embodiment of the present invention.
Figure 6:
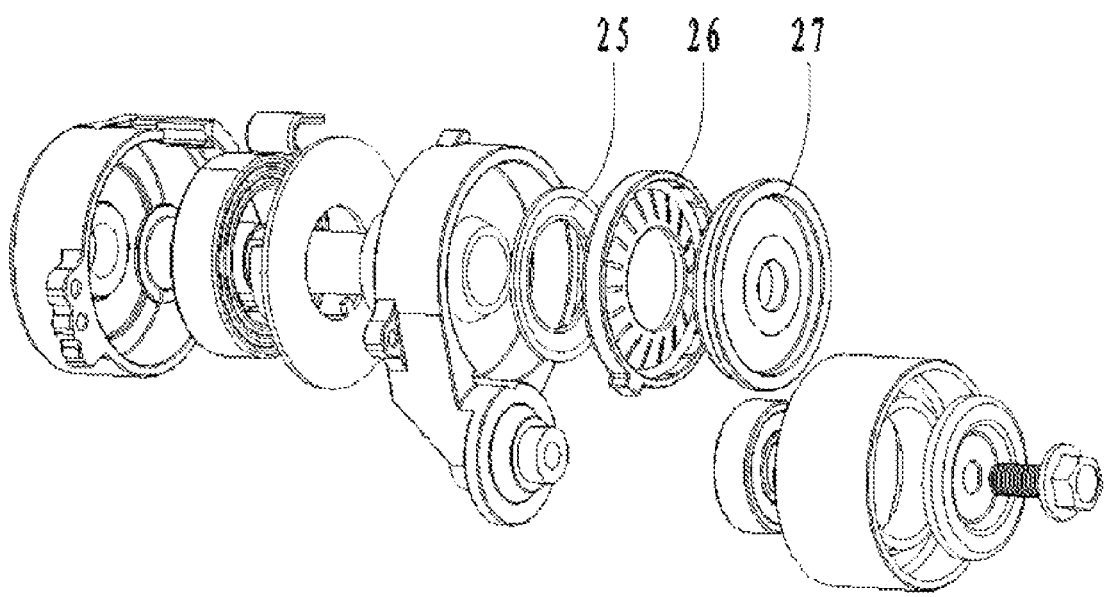
FIG. 6 is an exploded view of a conventional tensioner.
Figure 7:
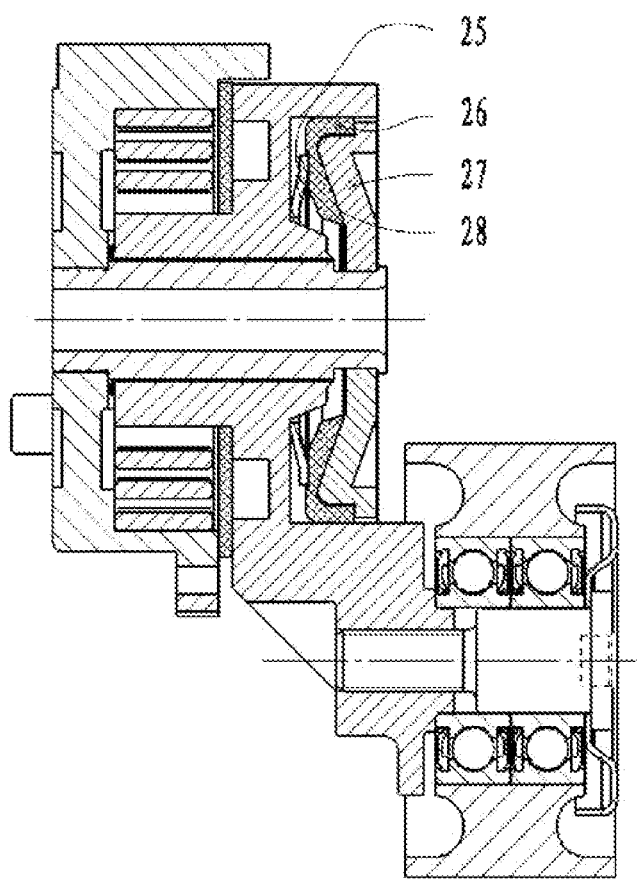
FIG. 7 is a side view of the above mentioned conventional tensioner.
Figure 8:
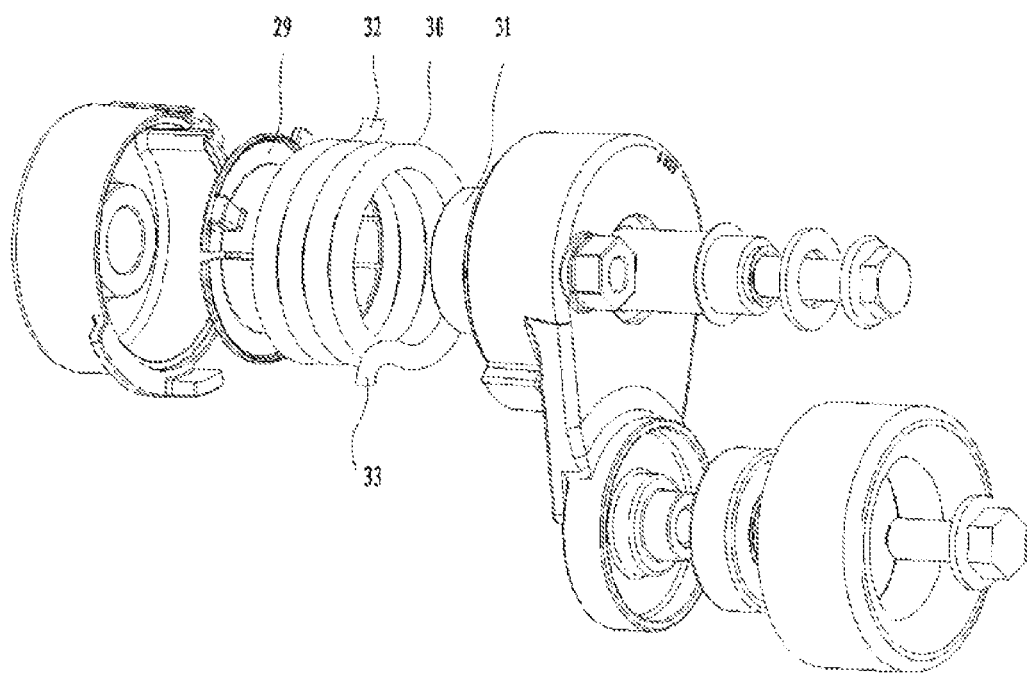
FIG. 8 is an exploded view of another conventional tensioner.
Figure 9:
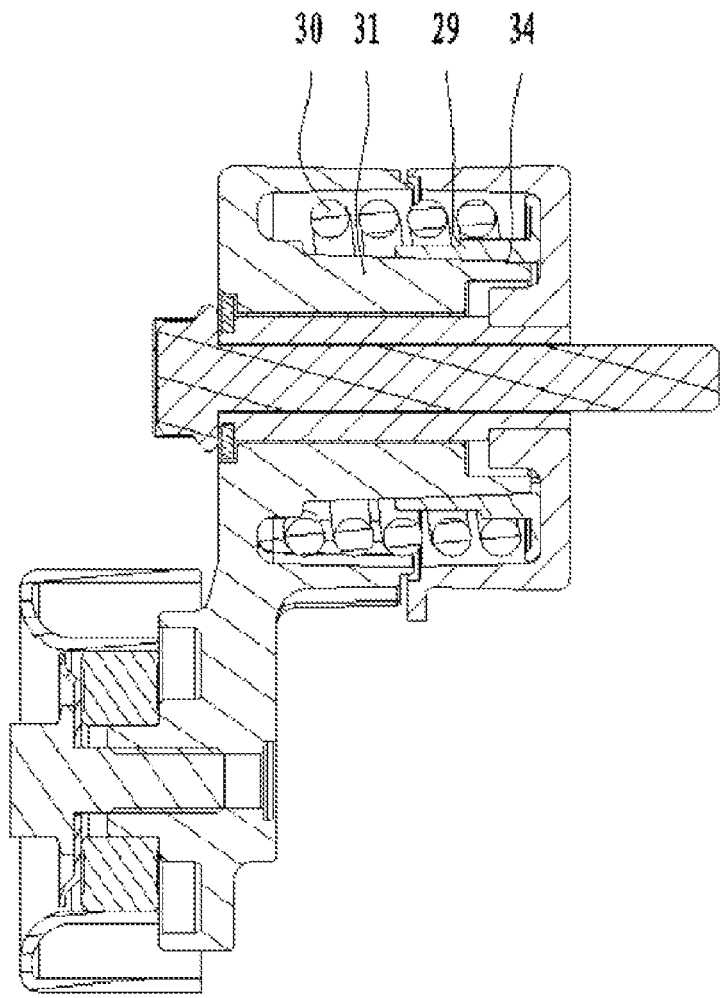
FIG. 9 is a side view of the above mentioned another conventional tensioner.

Referring to FIG. 3 and FIG. 5, the action force P is applied to a contacted portion between a side face of the projected member 19 and the fourth end surface 18 of the damping member 5, so the action force P is transmitted to the damping member 5 to generate an opposite reaction force P'. Then, the action force P is continuously transmitted to a contact portion between the third end surface 15 of the damping member 5 and the first end surface 16 of the elastic member 4, so as to transmit the action force P to the elastic member 4 to generate a second reaction force P1. The action force P and the second reaction force P1 is combined to form a second resultant force P2, wherein the second resultant force P2 is a normal positive force applied on the damping member 5, which is the first positive tension as mentioned. Furthermore, an additional frictional force is generated between the inner cylindrical surface 13 of the base 3 and a frictional surface 14 of the damping member 5. It is worth mentioning that action force P is offset by a torque force W generated by the elastic member 4, and the second end surface 17 of the elastic member 4 is locked by the base 3, so the rotation of the elastic member 4 is stopped.

Referring to FIG. 3 of the drawing, the elastic member 4 is rotated towards the loading direction by the action force P, such that the outer circumference of the elastic member 4 is radially expanded to press against the sliding surface of the sliding cavity 23 of the damping member 5, so as to generate a first radial distribution pressure $\Delta f$, and then a third resultant force P3 is generated at a normal direction of the friction surface 14 of the damping member 5, wherein the third resultant force P3 is the second positive tension as mentioned above. In addition, the outer circumference of the elastic member 4 is pressed against an inner cylindrical surface 24 of the tension arrangement 6 to generate a second radial distribution pressure $\Delta f$, and then a third opposite resultant force P3' is generated at a normal direction of the inner cylindrical surface 24 of the tension arrangement 6, wherein the third opposite resultant force P3' is offset by the third resultant force P3.

It is worth mentioning that the second resultant force P2 (the first positive tension) and the third resultant force P3 (the second positive tension) are both applied on the damping member 5 at the same time, so the tensioner can provide a relatively large amount of frictional force.

According to the preferred embodiment of the present invention, the tensioner of the present invention is a high damping tensioner and the attenuation of the damping thereof is relatively small during the entire life cycle thereof. Additional frictional force is generated between the inner cylindrical surface 13 of the base 3 and the friction surface 14 of the damping member 5. The tension arrangement 6 is rotated with respect to the base 3 to push the damping member 5, and then the elastic member 4 is actuated to rotate by the damping member 5 to generate the torque force, wherein the elastic member 4 is incorporated with the tension arrangement 6 to generate a second resultant force, which is the first positive tension for the tensioner.

At the same time, while the elastic member 4 is rotated towards the loading direction, the outer circumference of the elastic member 4 is radially expanded to activate that the damping member 5 closely contacts with the inner cylindrical surface 13 of the base 3, so as to generate the second positive tension for the tensioner. Since the first and second positive tensions are reacted simultaneously, a large amount of frictional force can be generated from the tensioner of the present invention, wherein the ratio of the torque of the damping and the elastic member can be 0.85 or even higher. Since the first positive tension and the second positive tension are derived from the spring torque generated from the elastic member 4, the abrasion loss of the damping cover 21 has slightly small effect to the angle of the torque for the elastic member 4 as well as that the elastic member 4 is radially expanded towards the loading direction, so the change of the torque of the elastic member 4 is relatively small. Since the attenuation of the frictional force is determined by the attenuation of the torque of the elastic member 4, the attenuation of the frictional force will not exceed 15% during the entire life-span of the tensioner of the present invention.

Referring to FIG. 10 to FIG. 15 of the drawings, a large damping and low attenuation tensioner for engines according to a second preferred embodiment of the present invention, wherein the tensioner comprises a base 10A, a retention arrangement 50A, a tension arrangement 40A, an elastic member 20A disposed within the base 10A, and a damping member 30A arranged inside the base 10A. The tension arrangement 40A is rotatably arranged on the base 10A via the retention arrangement 50A, such that the elastic member 20A and the damping member 30A are closely sealed inside the base 10A and the tension arrangement 1 OA.

Figure 14:
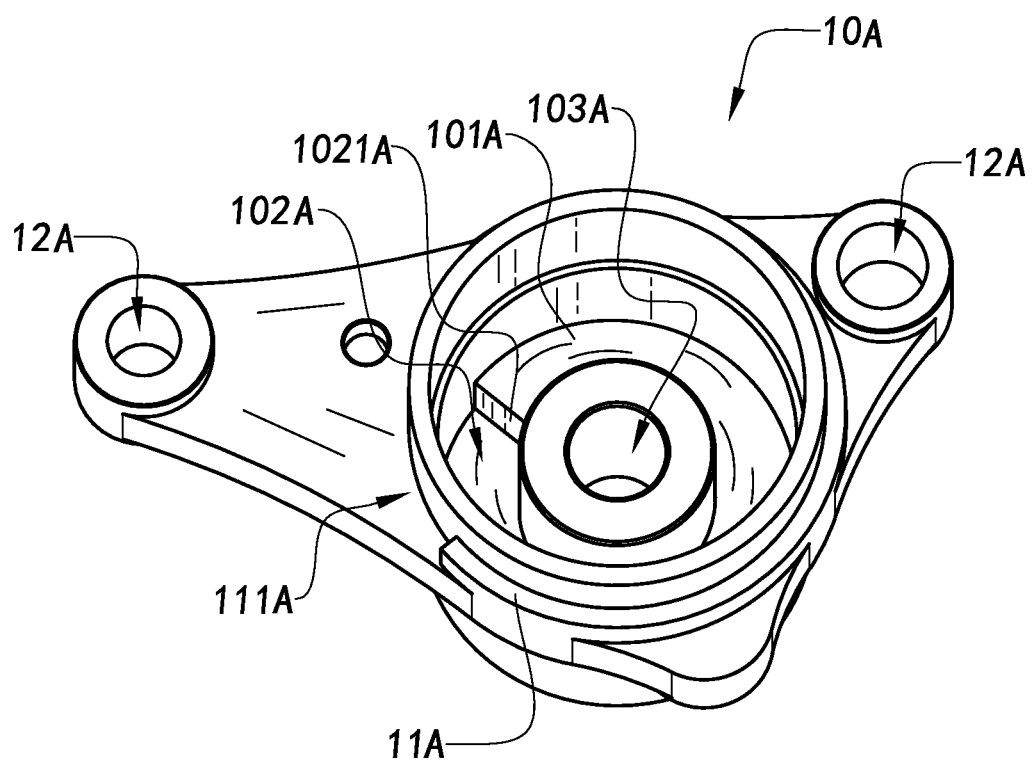
FIG. 14 is a perspective view of a base according to the above mentioned second preferred embodiment of the present invention.
Figure 15:
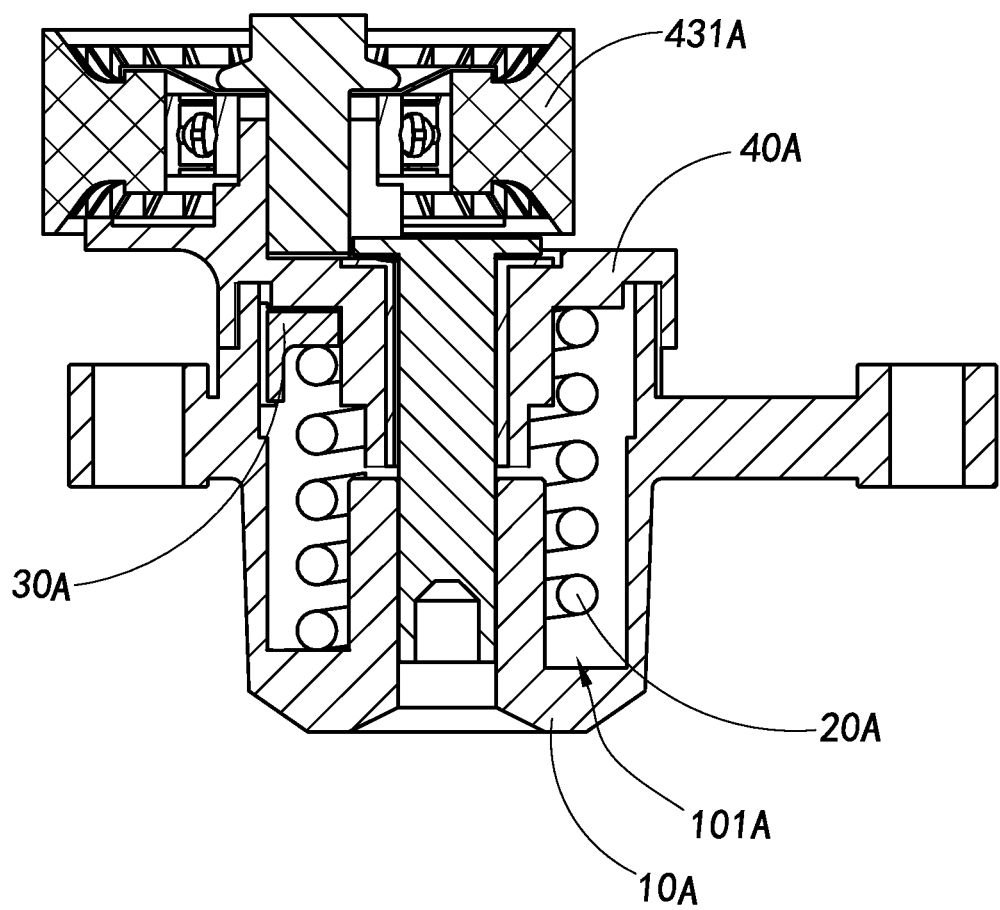
FIG. 15 is a side view of the tensioner according to the above mentioned second preferred embodiment of the present invention.

As shown in FIG. 14, the base 10A has a thrust groove 102A formed on a bottom of the base 10A at a mid-portion thereof, and a mounting cavity 101A integrally communicated with the thrust groove 102A. In other words, the thrust groove 102A is defined on the bottom portion of the base 10A. Since the elastic member 20A is disposed within the base 10A, the elastic member 20A is disposed in the mounting cavity 101A, and a bottom end portion of the elastic member 20A is disposed on the thrust groove 102A.

Figure 13:
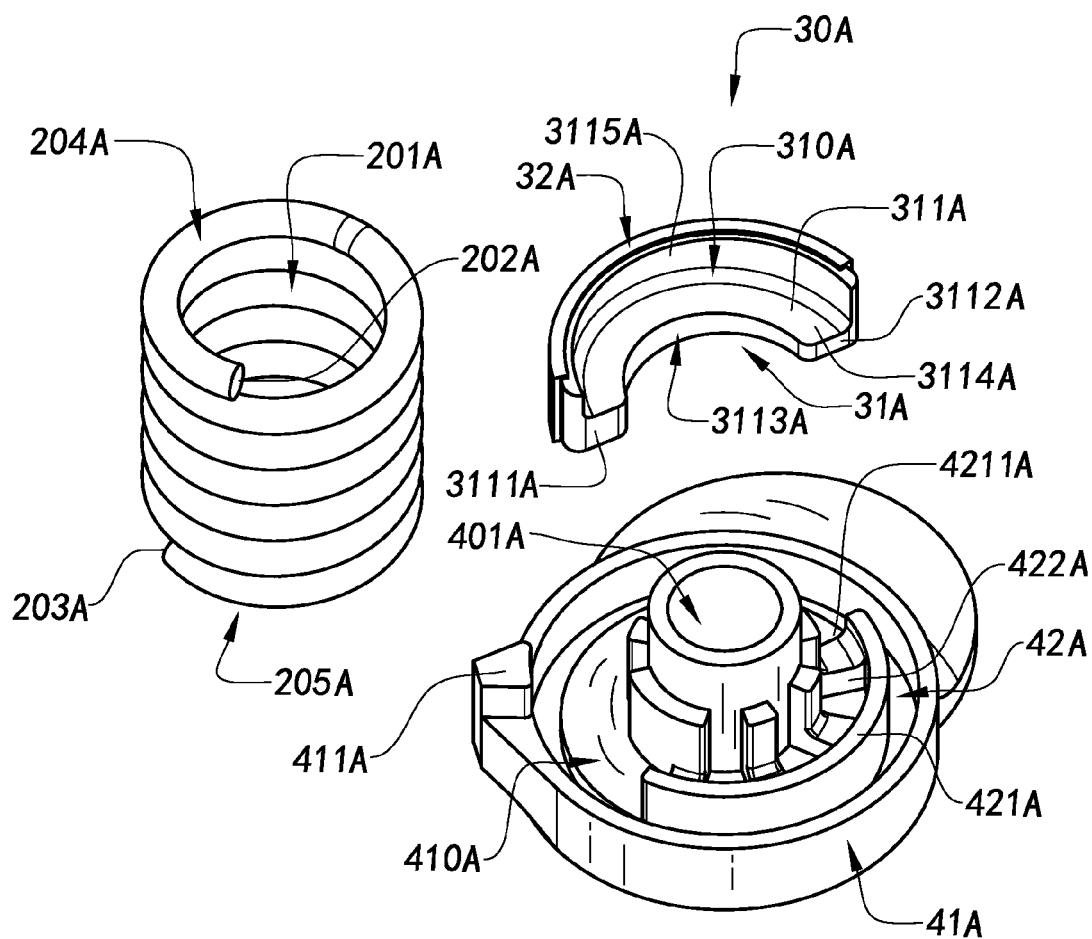
FIG. 13 is an exploded view of a damping member according to the above mentioned second preferred embodiment of the present invention, illustrating the damping member coupled on the elastic member.

As shown in FIG. 13, the elastic member 20A is a cylindrical torsion spring, and the elastic member 20A is a helical structure. The elastic member 4 comprises two end faces, which are a first end surface 202A and a second end surface 203A, wherein the first end surface 202A is defined at a first surface 204A of the elastic member 20A, and the second end surface 203A is defined at a second surface 205A of the elastic member 20A. In addition, the first surface 204A of the elastic member 20A is symmetrically arranged with the second surface 205A of the elastic member 20A, so the first end surface 202A and the second end surface 203A are symmetrically arranged with each other also. Furthermore, the first surface 204A and the second surface 205A of the elastic member 20A are not flat surfaces, so while either the first surface 204A or the second surface 205A of the elastic member 20A are placed on a flat surface, the elastic member 20A is inclinedly and vertically arranged on the flat surface.

Accordingly, the elastic member 20A is disposed inside the base 10A, and the elastic member 20A is perpendicularly arranged with respect to the inner bottom surface of the base 10A, so that the shape of the thrust groove 102A must match with either the first surface 204A or the second surface 205A of the elastic member 20A. The depth of the thrust groove 102A has different gradients, wherein the largest depth of the thrust groove 102A matches with the first end surface 202A or the second end surface 203A of the elastic member 20A. In other words, the depth of the thrust groove 102A is gradually decreased to match with the gradients of either the first end surface 202A or the second end surface 203A of the elastic member 20A. Therefore, while the elastic member 20A is disposed inside the mounting cavity 101A and the thrust groove 102A, the base 10A is perpendicular to the either the first end surface 202A or the second end surface 203A of the elastic member 20A. In addition, one end of the thrust groove 102A defines a stopping surface 1021A formed at the bottom side of the base 10A. Since either the first surface 204A or the second surface 205A of the elastic member 20A is disposed inside the thrust groove 102A, either the first end surface 202A or the second end surface 204A couples with the stopping surface 1021A. Therefore, the elastic member 20A will not be rotated with respect to the base 10A after a certain amount of torsional forces is applied on the elastic member 20A. In general, the thrust groove 102A is adapted to support the elastic member 20A being securely arranged inside the mounting cavity 101A and perpendicularly arranged on the bottom surface of the base 10A. And, the stopping surface 1021A is adapted to prevent the elastic member 20A installed inside the mounting cavity 101A being rotated by the torsional forces, in such manner that the torsional force applied on the elastic member 20A is converted into the deformation of the elastic member 20A, so as to storage these torsional forces into the elastic element 20A.

As shown in FIG. 14, the base 10A further comprises a fastening hole 103A formed on the bottom surface of an interior of the base 10A, wherein the retention arrangement 50A is passed through the fastening hole 103A to rotatably mount the tension arrangement 40A on the base 10A. The base 10A further comprises a thrust member 11A formed at an outer edge of the mounting cavity 101A of the base 10A, wherein the thrust member 11A defines a first sliding groove 111A, wherein two ends of first sliding groove 111A are integrally extended from an thrust end of the thrust member 11A, such that the retention arrangement 40A disposed within the base 10A can be rotated along the first sliding groove 111A. In other words, the angular displacement of the retention arrangement 40A with respect to the base 1 OA (the rotational movement of the retention arrangement 40A with respect to the base 10A) is configured by the size of the first sliding groove 111A. And, the base 10A further comprises at least one affixing member 12A outwardly and integrally extended from the mounting cavity 10A, wherein the affixing member 12A is adapted to install the tensioner on an external device.

Figure 10:
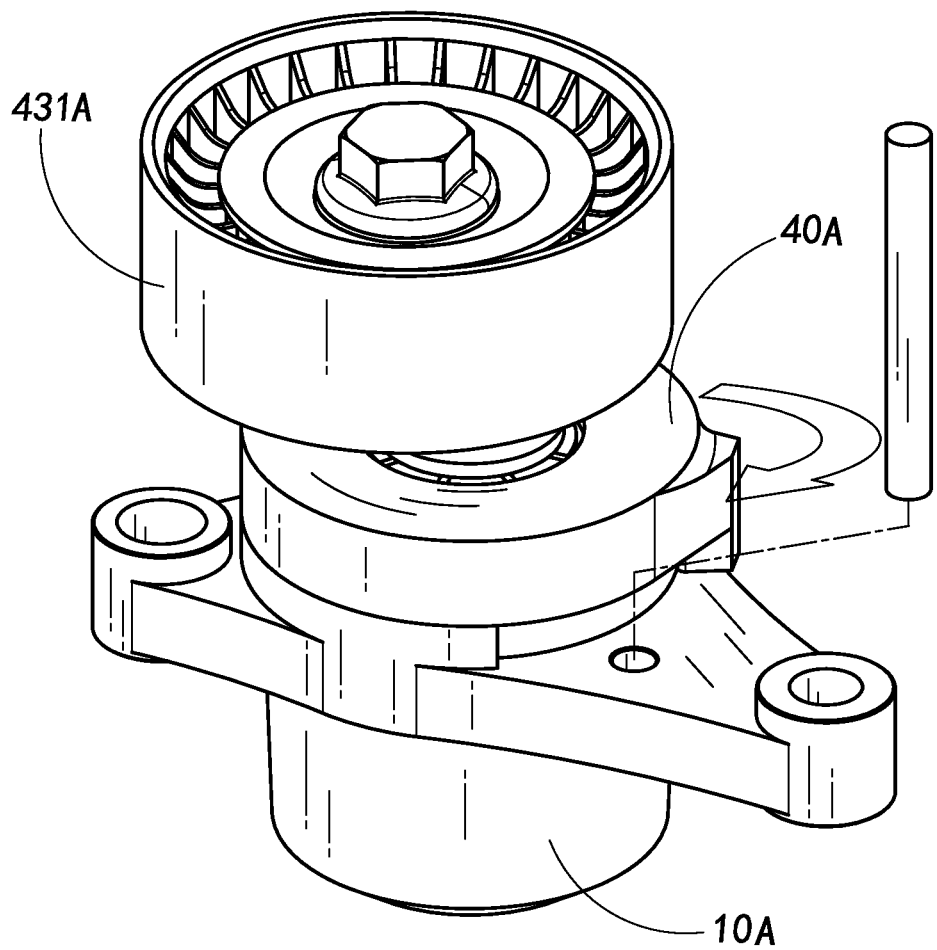
FIG. 10 and FIG. 11 are perspective views of a tensioner according to a second preferred embodiment of the present invention.
Figure 11:
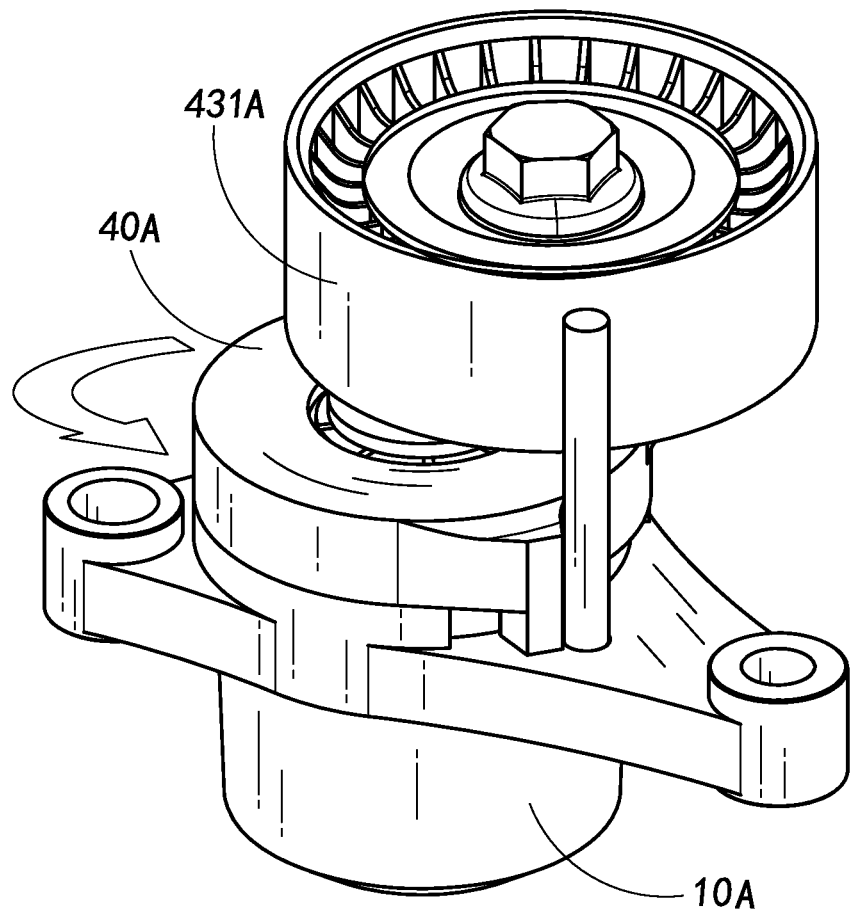

The damping member 30A is able to rotate towards an unloading direction and a loading direction, as shown in FIGS. 10 and 11. As shown in FIG. 13, the damping member 30A comprises a damping body 31A and a damping cover 32A, wherein the damping cover 32A wraps on an outer circumference of the damping body 31A, so while the damping member 30A is disposed inside the mounting cavity 101A of the base 10A, the damping cover 32A contacts with an inner wall of the mounting cavity 101A of the base 10A, so as to provide certain amounts of frictional forces. In general, the damping body 31A has a rigid structure. The damping body 31A can be made of cast steels, powder metallurgy components, or other material having a predetermined amount of strength and an easily-molding structure. The damping cover 32A is made of elastic material, wherein the elastic material can be wear-resistant materials. In order to improve the frictional coefficient of the damping cover 31A, a plurality of anti-slip strips is provided on the damping cover 31A. Accordingly, the damping body 31A further comprises a main body 311A and a second sliding groove 310A formed on an inner-bottom portion of the main body 311A. In order to ensure the damping member 30A smoothly sliding along the inner wall of the mounting cavity 101A of the base 10A, the damping member 30A is designed to have an arc-shape, so the second sliding groove 310A of the main body 311A is also formed in an arc-shaped structure, wherein the arc-shaped second sliding groove 31 OA is adapted to match with the shape of the first surface 204A of the elastic member 20A, so the first surface 204A of the elastic member 20A is wrapped within the second sliding groove 310A.

The main body 311A of the damping body 31A comprises a first forcing surface 3111A (i.e. the fourth end surface), a second forcing surface 3112A (i.e. the third end surface), a upper forcing surface 3113A, a bottom forcing surface 3114A, and an outer forcing surface 3115A, wherein the second sliding groove 310A is formed between the bottom forcing surface 3114A and the outer forcing surface 3115A, and a predetermined distance (thickness) is formed between the upper forcing surface 3113A and the bottom forcing surface 3114A. The first forcing surface 3111A is located on a first sidewall (at the right side) of the main body 31A, and the second forcing surface 3112A is located on an opposed second sidewall (at the left side) of the main body 31A, and the damping cover 32A is coupled on the outer side of the outer forcing surface 3115A. The second sliding groove 31 OA is arranged on the first surface 204A of the elastic member 20A, and the upper forcing surface 3113A must be maintained in a horizontal state while the damping member 30A is placed on the elastic member 20A. However, the first surface 204A of the elastic member 20A is a helical shape, so the height of the first surface 204A of the elastic member 20A is gradually increased, and in such manner that a thickness from the upper forcing surface 3113A and the bottom forcing surface 3114A is not constant. The thickness between the upper forcing surface 3113A and the bottom forcing surface 3114A at the first forcing surface 3111A (the thicker portion) is larger than the thickness between the upper forcing surface 3113A and the bottom forcing surface 3114A at the second forcing surface 3112A (the thinner portion). The thicker portion of the damping member 30A is to contact the lower point of the first surface 204A of the elastic member 20A and the thinner portion of the damping member 30A is to contact the higher point of the first surface 204A of the elastic member 20A. Therefore, while the damping member 30A is placed on the elastic member 20A, the upper surface 3113A of the damping member 30A is parallel to the bottom surface of the base 10A. It is worth mentioning that while the elastic member 20A is rotated downwardly as well as that the damping member 30A is coupled with the elastic member 20A, the first forcing surface 3111A contacts with the first surface 204A of the elastic element 20A, so as to stop the damping member 30A being downwardly rotate by the first surface 204A of the elastic member 20A. While the elastic member 20A is installed into the base 10A as well as that the damping member 30A is installed on the elastic member 20A, the damping cover 32A coupled on the damping member 30A contacts with the inner wall of the mounting cavity 101A, so the first surface 204A defined on the first end face 101A of the elastic member 20A is sliding along the inner wall of the mounting cavity 101A. Therefore, the elastic member 20 can prevent the relative sliding movement between the damping member 30A and the inner wall of the mounting cavity 101A.

Figure 12:
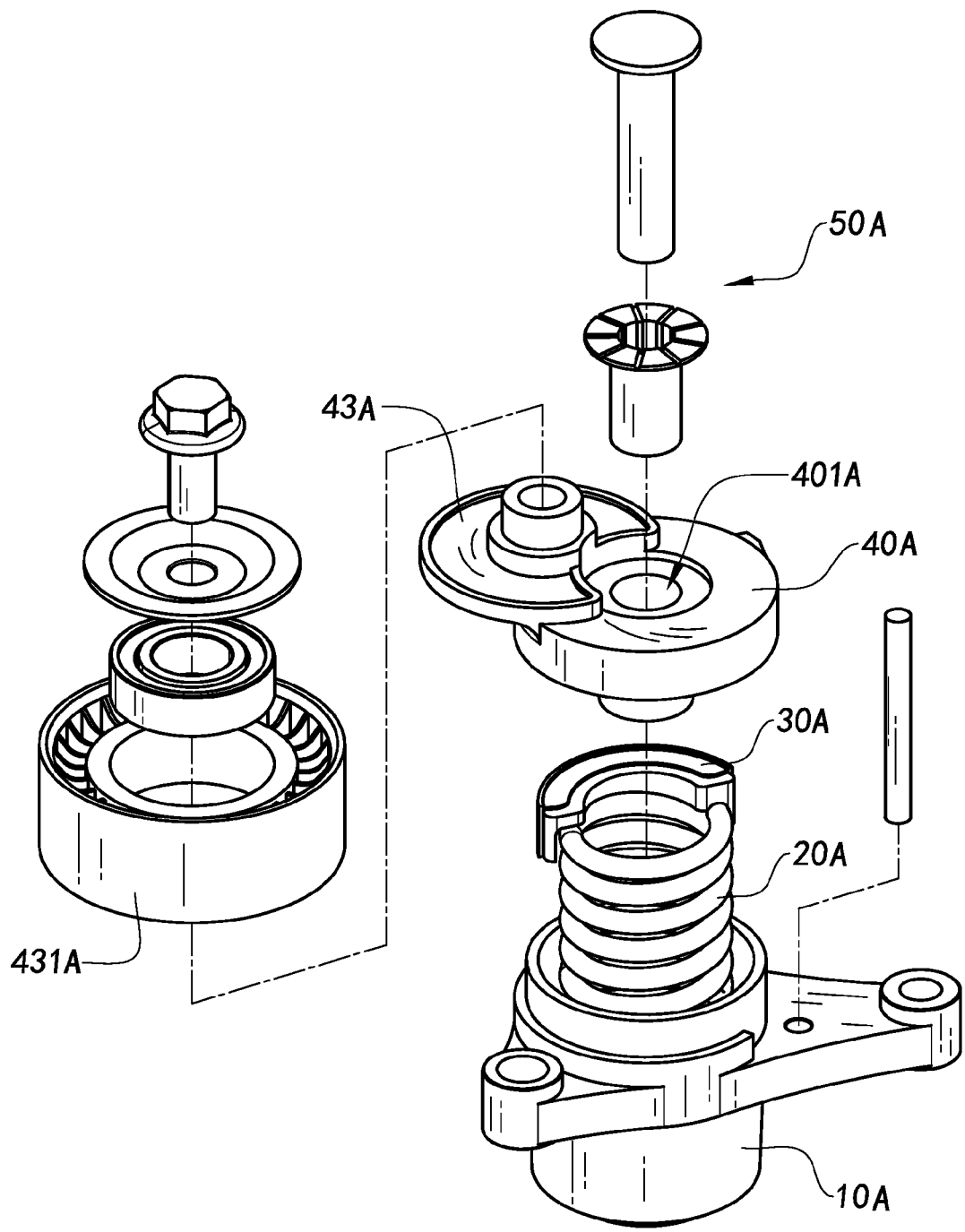
FIG. 12 is an exploded view of a tensioner according to the above mentioned second preferred embodiment of the present invention.

Referring to FIG. 12 to FIG. 13 of the drawings, the tension arrangement 40A comprises a tension body 41A, a pushing member 42A disposed inside the tension body 41A, and a tension wheel member 43A integrally extended from the tension body 41A, wherein the tension body 41A has a tension hole 401A to communicate with the fastening hole 103A of the base 10A, and in such manner that the retention arrangement 50A is able to pass through the tension hole 401A of the tension body 41A and the fastening hole 103A of the base 10A respectively, so as to couple the tension arrangement 40A and the base 10A together. The tension body 41A has an inner chamber 410A, and comprises a projected member 411A provided on an outer edge of the tension body 41A, wherein the pushing member 42A disposed inside the inner chamber 410A. While the retention arrangement 40A is installed on the base 10A, the projected member 411A is disposed inside the first sliding groove 111A of the thrust member 11A of the base 10A. That is to say, the projected member 411A is sliding along the first sliding groove 111A of the base 10A. Therefore, the rotational displacement between the tension arrangement 40A and the base 10A is determined by the projected member 411A and the first sliding groove 111A. In other words, the rotational displacement between the tension arrangement 40A and the base 10A is limited within one end of the first sliding groove 111A of the thrust member 11A to the other end thereof.

In particular, the pushing member 42A comprises a pushing main body 421A formed at an inner surface of the pushing member 42A and one or more reinforcing members 422A, wherein the pushing main body 421A is downwardly extended from the inner surface of the pushing member 42A, and the reinforcing members 422A are formed between the pushing main body 421A and the inner surface of the pushing member 42A to securely attach the pushing main body 421A and the pushing member 42A together, so as to reinforce the structure of the pushing main body 421A. Specifically, the structure of the pushing main body 421A is a circular arc-shaped structure, and the total arc length of the pushing main body 421A and the damping member 30A is smaller than the entire circumferential length of the elastic element 20A. The size of the pushing main body 421A matches with the elastic member 20A. In particular, when the tension arrangement 40A is mounted on the base 10A, the pushing main body 421A is adapted to wrap around at least a portion of an outer circumference of the elastic member 20A, so as to wrap the first surface 204A of the elastic member 20A. Accordingly, since the first surface 204A of the elastic member 20A is helical shape, the inner surface of the tension body 41A which contacts with the first surface 204A of the elastic member 20A has a height difference structure. Therefore, the pushing main body 421A also has the height difference structure. It is worth mentioning that the pushing main body 421A comprises a forcing surface 4211A. The forcing surface 4211A contacts with the second forcing surface 3112A of the damping member 30A while the tension arrangement 40A is rotated with respect to the base 10A, so as to transfer the torsional force applied on the tension arrangement 40A to the damping member 30A.

As shown in FIG. 12, the tension wheel member 43A comprises a tension wheel 431A, wherein the tension wheel 431A is rotatably connected to the tension body 41A, and the torsional forces from the external device is transmitted to the tension body 41A by the tension wheel 431A.

Accordingly, the second surface 205A of the elastic member 20A is located at the thrust groove 102A formed on a bottom portion of the base 1 OA, wherein the second end surface 203A defined at a second surface 205A of the elastic member 20A contacts with the stopping surface 1021A of the thrust groove 102A, and the stopping surface 1021A is able to stop the rotation of the elastic member 20A so as to store the torsional forces applied on the elastic member 20A into the elastic member 20A. The damping member 30A is located on the first surface 204A of the elastic element 20A, such that the first forcing surface 3111A of the damping member 30A couples with the first end surface 202A of the elastic member 20A while the first surface 204A thereof contacts with the bottom forcing surface 3114A of the damping member 30A. The forcing surface 4211A of the pushing member 42A contacts with the second forcing surface 3112A of the damping member 30A, so the damping cover 32A contacts with the inner wall of the mounting cavity 101A of the base 10A. The first surface 204A of the elastic member 20A is arranged within the second sliding groove 31 OA. Therefore, the torsional forces applied on the tension arrangement 40A is able to transfer to the damping member 30A by the pushing member 42A, and then the damping member 30A is able to transmit the torsional forces to the elastic member 20A and the torsional forces is stored into the elastic member 20A.

In particular, while the damping member 30A is rotated in the loading direction, the damping member 30A will receive two different directions of forces to generate a huge amount of damping, which is a huge amount of frictional force. At the same time, the abrasion loss of the damping cover 32A has slightly small effect to the angle of the torque for the elastic member 20A, so the change of the torque of the elastic member 20A is relative small.

In particular, when the tensioner is operated towards the loading direction, a pushing force is applied on the second forcing surface 3112A of the damping member 30A by the forcing surface 4211A of the pushing main body 421A of the pushing member 42A, and then the pushing force is transmitted to the elastic member 20A by the first forcing surface 3111A of the damping member 30A, so as to cause the deformation of the elastic member 20A, i.e. the radial expansion thereof. Therefore, the first end surface 202A and the second end surface 203A of the elastic member 20A are radially expanded to enlarge the diameter of the elastic member 20A.

Figure 16:
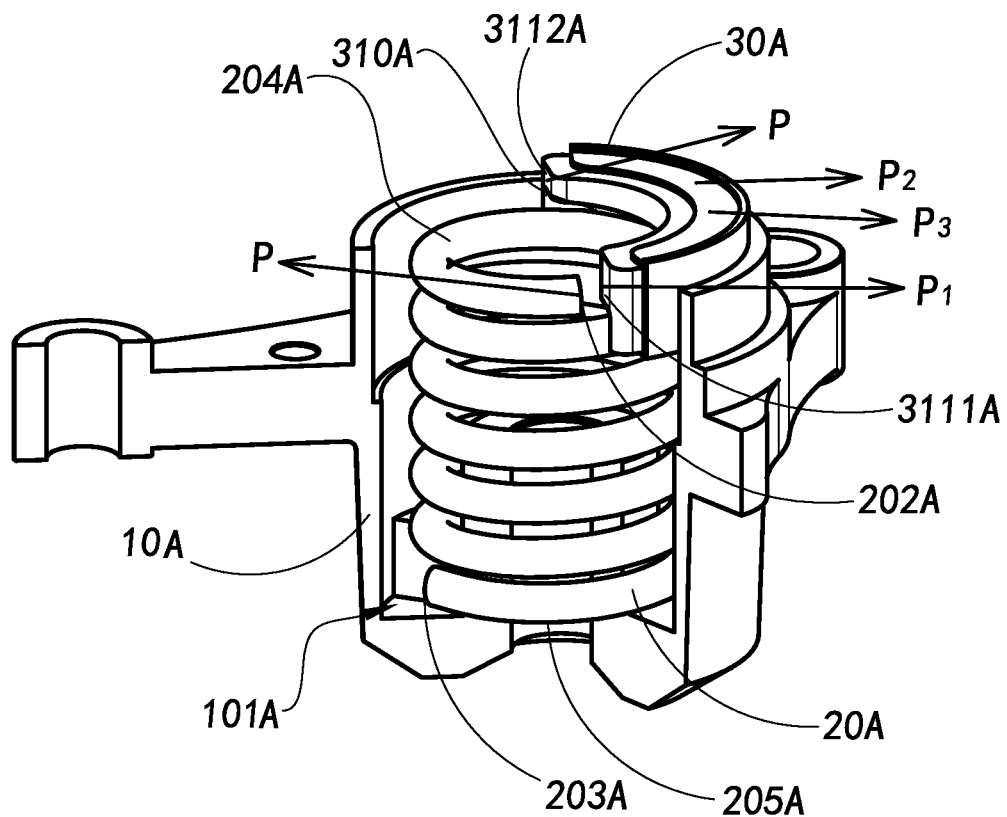
FIG. 16 illustrates different tensions distributed at the tensioner according to the above mentioned second preferred embodiment of the present invention.

As shown in FIG. 16, a second positive tension P3 is applied on the inner wall of the mounting cavity 101A (i.e. the inner cylindrical surface) by the first surface 204A of the elastic member 20A. In particular, the pushing forces applied on the elastic member 20A by the first forcing surface 3111A of the damping member 30A will generate a reaction force P1 towards the inner wall of the mounting cavity 101A. In addition, an action force P towards the inner wall of the mounting cavity 101A is applied to the second forcing surface 3112A of the damping member 30A by the pushing member 42A, and then the action force P and the reaction force P1 are combined together to form a first positive tension P2. The directions of the first positive tension P2 and the second positive tension P3 are the same, so the directions thereof are both towards the inner wall of the mounting cavity 101A. Therefore, the damping member 30A receives two positive tensions at the same time as well as that the damping member 30A is rotated towards the loading direction, so as to improve the frictional force provided by the tensioner of the present invention.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A tensioner, comprising:
a base having an inner cylindrical surface;
a retention arrangement comprising a shaft extended into and rotatable within said base;
a tension arrangement, comprising a projected member, rotatably coupled at said base via said shaft, wherein said shaft of said tension arrangement and said retention arrangement is separated by a bush;
a damping member disposed inside said base and being rotated in a loading direction by said projected member, wherein said damping member has a frictional surface contacted with said inner cylindrical surface of said base, wherein said damping member has an arc-shaped defining two ends and forming a third end surface and a fourth end surface at said two ends of said damping member respectively, wherein said damping member is driven to rotate within said base by said projected member, such that when said tension arrangement is rotated at said base, said projected member pushes said damping member to rotate;
an elastic member disposed within said base in a non-rotatably movable manner to bias against an inner surface of said damping member, wherein said elastic member has a first end surface and an opposed second end surface defined at two end faces of said elastic member respectively, wherein said first end surface of said elastic member contacts with and couples at said third end surface of said damping member, wherein said second end surface of said elastic member contacts with and couples at a bottom side of said base, wherein said fourth end surface of said damping member couples with said projected member of said tension arrangement, wherein a position of said damping member is directly in opposition to an external force applied to said tension arrangement, wherein a reaction force of said damping member is close to said external force to minimize a deflection torque applied at said shaft, wherein when said tension arrangement is rotated with respect to said base, said projected member not only pushes said damping member to rotate to generate a first positive tension between said frictional surface of said damping member and said inner cylindrical surface of said base, but also expands said elastic member radially to generate a second positive tension between an outer circumference of the elastic member and said inner surface of said damping member, such that said first positive tension and said second positive tension are generated at the same time to enhance a damping force of said tensioner.

2. The tensioner, as recited in claim 1, wherein said elastic member is a cylindrical torsion spring having a helical structure.

3. The tensioner, as recited in claim 1, wherein said damping member further has a sliding cavity formed at said inner surface of said damping member and defined a sliding surface at said sliding cavity, wherein said elastic member is frictionally contacted with said inner surface of said damping member at said sliding cavity, wherein an outer circumference of said elastic member is radially expanded to press against said sliding surface of said damping member for generating a first radial distribution pressure, wherein said outer circumference of said elastic member is also pressed against an inner cylindrical surface of said tension arrangement to generate a second radial distribution pressure.

4. The tensioner, as recited in claim 2, wherein said damping member further has a sliding cavity formed at said inner surface of said damping member and defined a sliding surface at said sliding cavity, wherein said elastic member is frictionally contacted with said inner surface of said damping member at said sliding cavity, wherein an outer circumference of said elastic member is radially expanded to press against said sliding surface of said damping member for generating a first radial distribution pressure, wherein said outer circumference of said elastic member is also pressed against an inner cylindrical surface of said tension arrangement to generate a second radial distribution pressure.

5. The tensioner, as recited in claim 1, wherein said damping member comprises a damping cover, which is made of wear-resistant nylon, and a damping body which is made of rigid material, wherein said damping cover and said damping body have semicircular structure, wherein said damping cover wraps at an outer circumferential surface of said damping body to define a joint portion therebetween, wherein a plurality of mating teeth are spacedly formed at said joint portion.

6. The tensioner, as recited in claim 4, wherein said damping member comprises a damping cover, which is made of wear-resistant nylon, and a damping body which is made of rigid material, wherein said damping cover and said damping body have semicircular structure, wherein said damping cover wraps at an outer circumferential surface of said damping body to define a joint portion therebetween, wherein a plurality of mating teeth are spacedly formed at said joint portion.

* * * * *